United States Patent [19]
Chaddha

[11] Patent Number: 5,844,613
[45] Date of Patent: Dec. 1, 1998

[54] GLOBAL MOTION ESTIMATOR FOR MOTION VIDEO SIGNAL ENCODING

[75] Inventor: Navin Chaddha, Sunnyvale, Calif.

[73] Assignee: Microsoft Corporation, Redmond, Wash.

[21] Appl. No.: 885,623

[22] Filed: Jun. 30, 1997

Related U.S. Application Data

[63] Continuation-in-part of Ser. No. 714,447, Mar. 17, 1997.

[51] Int. Cl.$^6$ ........................................................ H04N 7/12
[52] U.S. Cl. ........................... 348/416; 348/402; 348/415; 348/388
[58] Field of Search ..................................... 348/384, 388, 348/402, 416, 415, 409, 407, 401, 400, 413, 397; H04N 7/12

[56] References Cited

U.S. PATENT DOCUMENTS

| | | | |
|---|---|---|---|
| 5,235,419 | 8/1993 | Krause | 348/416 |
| 5,367,385 | 11/1994 | Yuan | 348/420 |
| 5,426,462 | 6/1995 | Bui | 348/401 |
| 5,510,834 | 4/1996 | Weiss et al. | 348/416 |
| 5,592,228 | 1/1997 | Dachiku et al. | 348/416 |
| 5,621,660 | 4/1997 | Chaddha et al. | 348/397 |

*Primary Examiner*—Tommy P. Chin
*Assistant Examiner*—Gims S. Philippe
*Attorney, Agent, or Firm*—Schwegman, Lundberg, Woessner & Kluth, P.A.

[57] ABSTRACT

A transformation filter estimates global transformation parameters between a current frame and a previous frame of a motion video image according to corresponding relative positions of pixels within the two frames. Such estimated global transformation parameters estimate global translation, rotation, and scaling resulting from camera pan, rotation, and zoom. The current frame is transformed according to the estimated transformation parameters. As a result, the transformed current frame more closely correlates with the previous frame and motion compensated compression provide better compression and reduced distortion simultaneously. The transformed current frame is encoded using entropy-constrained vector quantization (ECVQ) using quadtrees for variable block sizes within the representation of the current frame. Such quadtree ECVQ is improved significantly when the single frame is first globally transformed in accordance estimated transformation parameters between the single frame and the previous frame. As a result, larger block sizes can be used more efficiently when differences between the current frame and the previous frame are due primarily to camera pan, zoom, and/or rotation. Of course, when significant differences between the frames are due primarily to motion in the subject matter of the motion video image, smaller frame sizes adapted through ECVQ quadtree encoding still reduce the size of the encoded frame without unduly sacrificing motion video image quality.

6 Claims, 3 Drawing Sheets

GLOBAL MOTION ESTIMATOR FOR MOTION VIDEO SIGNAL ENCODING

CROSS REFERENCE TO RELATED APPLICATIONS

This application is a continuation-in-part of U.S. patent application Ser. No. 08/714,447 by Navin Chaddha entitled "Multimedia Compression System with Additive Temporal Layers" and filed Mar. 17, 1997.

FIELD OF THE INVENTION

The present invention relates to digital video signal compression and, in particular, to a particularly efficient signal encoding mechanism for encoding digital video signals.

BACKGROUND OF THE INVENTION

With the advent of digital video products and services, such as Digital Satellite Service (DSS) and storage and retrieval of video streams on the Internet and, in particular, the World Wide Web, digital video signals are becoming ever present and drawing more attention in the marketplace. Because of limitations in digital signal storage capacity and in network and broadcast bandwidth limitations, compression of digital video signals has become paramount to digital video storage and transmission. As a result, many standards for compression and encoding of digital video signals have been promulgated. For example, the International Telecommunication Union (ITU) has promulgated the H.261 and H.263 standards for digital video encoding. Additionally, the International Standards Organization (ISO) has promulgated the Motion Picture Experts Group (MPEG), MPEG-1, and MPEG-2 standards for digital video encoding.

These standards specify with particularity the form of encoded digital video signals and how such signals are to be decoded for presentation to a viewer. However, significant discretion is left as to how the digital video signals are to be transformed from a native, uncompressed format to the specified encoded format. As a result, many different digital video signal encoders currently exist and many approaches are used to encode digital video signals with varying degrees of compression achieved.

The primary objective of any digital video signal encoder is to achieve a high degree of compression without a significant loss of video signal. Video signal compression is generally achieved by representing identical or similar portions of an image as infrequently as possible to avoid redundancy. A digital motion video image, which is sometimes called a video stream, is organized hierarchically into groups of pictures which includes one or more frames, each of which represents a single image of a sequence of images of the video stream. All frames are compressed by reducing redundancy of image data within a single frame. Motion-compensated frames are further compressed by reducing redundancy of image data within a sequence of frames.

Briefly, each frame includes a number of macroblocks which define respective portions of the video image of the frame. An I-frame is encoded independently of all other frames and therefore represents an image of the sequence of images of the video stream without reference to other frames. P-frames are motion-compensated frames and are therefore encoded in a manner which is dependent upon other frames. Specifically, a P-frame is a predictively motion-compensated frame and depends only upon one I-frame or, alternatively, another P-frame which precedes the P-frame in the sequence of frames of the video image. The H.263 standard also describes BP-frames; however, for the purposes of description herein, a BP-frame is treated as a P-frame.

In mapping macroblocks from one frame to corresponding blocks of a temporally displaced frame, a motion vector maps a spatial displacement within the temporally displaced frame of a relatively closely correlated block of pixel or picture elements. In frames in which subject matter is moving, motion vectors representing spatially displacement can identify a corresponding block which matches a particular macroblock rather closely. Such is also true when the video sequence including the respective frames includes a camera pan, i.e., a generally uniform spatial displacement of the entirety of the subject matter of the motion video image. Such is not true, however, when the video sequence including the respective frames includes camera rotation or zoom.

As used herein, camera zoom refers to a generally uniform change in scale of the subject matter of a motion video image as represented in a sequence of frames of the motion video image. As a result of the change in scale between temporally displaced frames, macroblocks of one frame generally do not correlate to same-sized blocks of another frame of the sequence. Camera rotation, as used herein, refers to a generally uniform rotation of the entirety of the subject matter of a motion video image as represented in a sequence of frames which can result, for example, when a video camera is tilted from side to side while recording. Due to the rotation of the subject matter between frames, macroblocks of one frame do not correlate well to same-sized blocks of another frame of the sequence. Since the rotation and/or change in scale is generally uniform throughout each frame, no macroblocks of one frame correlate well to any same-sized block of another frame of the sequence. Accordingly, motion compensation to reduce redundancy between frames is less effective and more data is generally required to represent the motion video image. Image quality can be sacrificed if available bandwidth is insufficient to represent the motion compensated image.

A need persists in the industry for a motion video image encoder which achieves ever greater degrees of compression without sacrificing image quality.

SUMMARY OF THE INVENTION

In accordance with the present invention, a transformation filter estimates global transformation parameters between a current frame and a previous frame of a motion video image according to corresponding relative positions of pixels within the two frames. Such estimated global transformation parameters estimate global translation, rotation, and scaling resulting from camera pan, rotation, and zoom. The current frame is transformed according to the estimated transformation parameters. As a result, the transformed current frame more closely correlates with the previous frame and motion compensated compression provide better compression and reduced distortion simultaneously.

The transformed current frame is encoded using entropy-constrained vector quantization (ECVQ) using quadtrees for variable block sizes within the representation of the current frame. In such quadtree ECVQ encoding, distortion and rate for a given block and divided portions of the block are computed and compared. If the portions of the block, generally referred to as sub-blocks, provide a combined reduction in rate and distortion, the portions of the block are used (a smaller blocksize) in place of the whole block. Otherwise, the whole block is used to represent that portion of the frame (a larger block size for that portion of the frame).

Smaller block sizes tend to map more directly to corresponding blocks of a previous frame and therefore require less data to represent the difference between corresponding blocks of the current and previous frames. However, smaller block sizes require the use of more blocks to represent the entire current frame and therefore require representation of more motion vectors between the frames. When two frames differ significantly, the improved correlation between smaller blocks generally outweighs the disadvantage of requiring more motion vectors to represent a frame. Smaller block sizes are therefore preferred when the differences between frames are more significant.

Larger block sizes tend not to map as well to corresponding blocks of a previous frame and therefore require more data to represent the difference between corresponding blocks of the current and previous frames. However, larger block sizes require fewer blocks to represent a frame and therefore require fewer motion vectors. When two frames differ less significantly, the efficiency of few motion vectors generally outweighs the disadvantage of requiring more data to represent differences between corresponding blocks.

In quadtree ECVQ, a single frame can be represented using large blocks for portions which correlate well with corresponding portions of a previous frame and using small blocks for portions which do not correlate as well with corresponding portions of the previous frame. Such quadtree ECVQ is improved significantly when the single frame is first globally transformed in accordance estimated transformation parameters between the single frame and the previous frame. As a result, larger block sizes can be used more efficiently when differences between the current frame and the previous frame are due primarily to camera pan, zoom, and/or rotation. Of course, when significant differences between the frames are due primarily to motion in the subject matter of the motion video image, smaller frame sizes adapted through ECVQ quadtree encoding still reduce the size of the encoded frame without unduly sacrificing motion video image quality.

DETAILED DESCRIPTION

Figure 1:
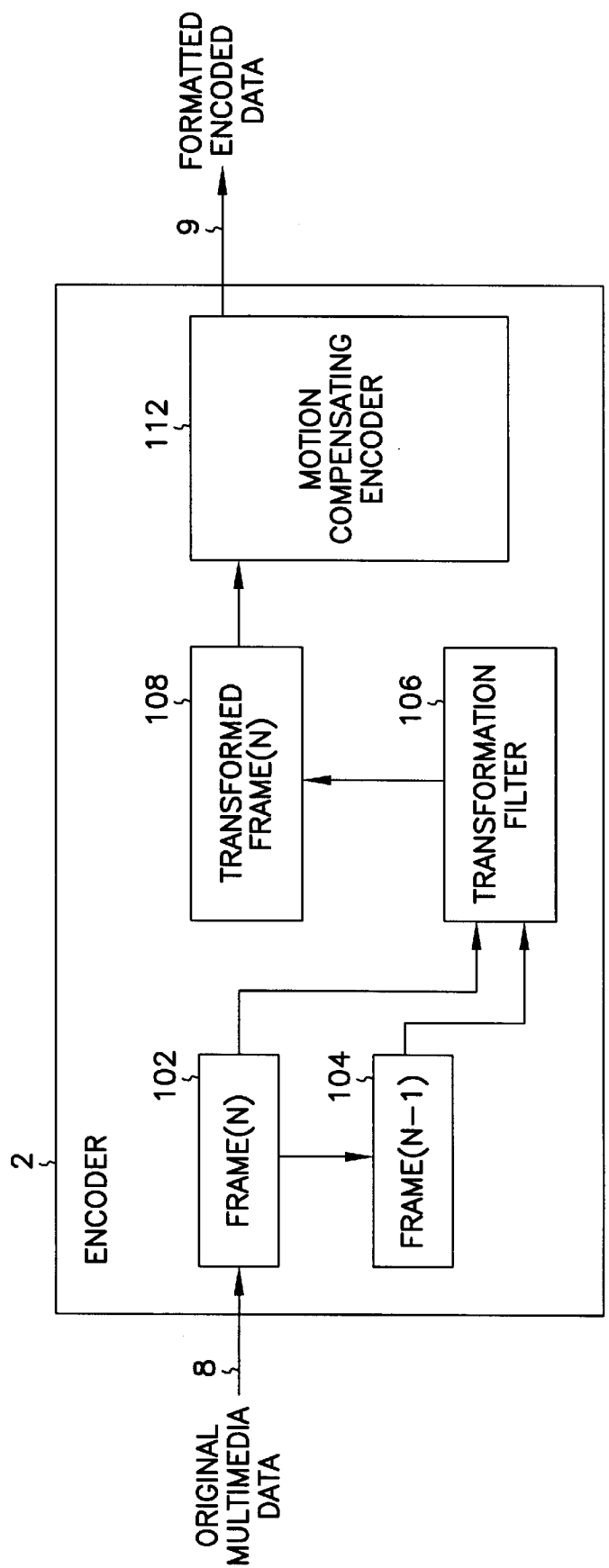
FIG. 1 is a block diagram of a video signal encoder according to the present invention.

In accordance with the present invention, a transformation filter 106 (FIG. 1) a video signal encoder 2 estimates a global image transformation between a current frame and a previous frame and uses the global image transformation to compensate for camera pan, zoom, and rotation. Encoder 2 accepts original multimedia data 8 which is generally multimedia data including, for example, still image, video, and/or audio data in a standard, uncompressed format. The resulting output of encoder 2 is formatted encoded data 9 which is a compressed representation of original multimedia data 8.

Encoder 2 includes buffers 102 and 104, each of which stores a frame of original multimedia data 8. Each frame accepted by encoder 2 is stored in buffer 102 and any frame previously stored in buffer 102 is moved to buffer 104. Accordingly, buffer 102 stores a current frame and buffer 104 stores a previous frame.

Transformation filter 106 receives the current and previous frames from buffers 102 and 104, respectively, and estimates a global image transformation between the current and previous frames. In general, image transformations include translation, scaling, and rotation as represented in the following equation.

$$\begin{bmatrix} x_n \\ y_n \end{bmatrix} = \begin{bmatrix} z_x & r \\ -r & z_y \end{bmatrix} \begin{bmatrix} x_{n-1} \\ y_{n-1} \end{bmatrix} + \begin{bmatrix} t_x \\ t_y \end{bmatrix} \quad (1)$$

In equation (1), $(x_n, y_n)$ represents the position of a given pixel in the current frame. $(x_{n-1}, y_{n-1})$ represents the corresponding position of the same pixel in the previous frame. The manner in which the corresponding position in the previous frame of a given pixel of the current frame is described more completely below. Zoom factors are represented by $z_x$ and $z_y$ in equation (1). In one embodiment, $z_x$ and $z_y$ are identical since camera zoom scales an image equally in the vertical and horizontal dimensions. However, some special effects introduced into motion video images include stretching in the vertical or horizontal direction independently thereby changing the aspect ration of successive frames of the motion video image. To properly handle such effects, $z_x$ $z_y$ are processed separately in an alternative embodiment. Global image rotation is represented in equation (1) by r. Global translation which results from camera pan is represented by $t_x$ and $t_y$ in equation (1) in which $t_x$ represents translation in the horizontal dimension and $t_y$ represents translation in the vertical dimension.

By comparing relative positions of representative pixels between the current and previous frames, transformation filter 106 estimates values for $z_x$, $z_y$, r, $t_x$, and $t_y$ and therefore estimates a global transformation between the frames. Transformation filter 106 transforms the current frame according to the estimated global transformation to produce a transformed current frame 108.

Encoder 2 includes a motion compensating encoder 110 which encodes transformed current frame 108 using entropy-constrained vector quantization (ECVQ) and quadtree representation as described in U.S. patent application Ser. No. 08/714,447 filed Sep. 16, 1996 by Navin Chaddha and entitled "Multimedia Compression System with Additive Temporal Layers" which description is incorporated herein by reference. Specifically, motion compensating encoder 110 finds and uses an optimized compromise between reduced rates of (1) motion compensated encoded blocks of transformed current frame 108 achieved by use of smaller blocks and (2) the amount of data required to represent motion vectors achieved by use of fewer, larger blocks.

Motion Compensation Using Quadtrees:

Many well-known video coding schemes use block-matching based motion compensation with a fixed block size, and motion vectors are coded using lossless entropy coding. The disadvantages of this method are that: 1) the predetermined block size is independent of the scene and may not be optimal; 2) the rate for encoding the motion vectors is fixed but may not be the optimal rate allocation between motion vectors and motion compensated prediction error.

We propose a scene adaptive motion compensation and coding scheme based on the quadtree structure with entropy-constrained vector quantization (ECVQ). For each block size, an entropy-constrained vector quantizer is built to provide good motion vectors over many rates. A quadtree structure is then constructed that finds the best block size to perform adaptive motion compensation for each area of the frame, and thus optimally allocates rates among the quantizers. Our simulation results have shown that this coding algorithm has superior rate-distortion performance over the fixed-block-size ECVQ method and the traditional full-search method with lossless coding.

In video coding, it is beneficial to use motion compensation to reduce the temporal redundancy between consecutive frames. One method that is employed by many well-known video coding schemes and standards such as px64 (described in M. Liou, "Overview of the px64 Kbits/s video coding standard," *Communications of the ACM,* Vol. 34, No. 4, pp. 59–63, April 1991) and MPEG (described in D. Le Gall, "MPEG: a video compression standard for multimedia applications," *Communications of the ACM,* Vol. 34, No. 4, pp. 46–58, April 1991) is the block-based full-search method, which includes the following three steps:

1. Motion compensation: The current frame is equally divided into blocks of fixed size. For each block, search among all the blocks within a search window in the previous frame and find a block that minimizes some distortion measure between that block and the current block.
2. Encoding of motion vectors by lossless entropy coding.
3. Encoding of the motion compensated prediction error.

Various schemes have been introduced to improve either one or more of the above three aspects. For example, to speed up the motion compensation, one may use some heuristics to search only a subset of all possible motion vectors and find a sub-optimal motion vector, such as the variable state motion search in S. C. Kwatra, C. M. Lin, and W. A. Whyte, "An adaptive algorithm for motion compensated color image coding," *IEEE Trans. Comm.,* Vol. COM-35, No. 7, pp. 747–754, July 1987. Other faster motion compensation algorithms have also been proposed.

Another aspect that can be improved is the encoding of motion vectors, which is the focus of this paper. Since the final goal in video coding is to minimize total rate R, which is the sum of the rate of motion vectors RM and the rate of prediction error RE, a desirable feature for the motion vector encoder is to be able to provide variable rates so that, when a target rate is given, an optimal rate allocation between RM and RE can potentially be found that minimizes the overall reconstruction error. In R. L. Joshi, T. R. Fischer, and R. H. Bamberger, "Lossy encoding or motion vectors using entropy-constrained vector quantization," *Proc. of ICIP-95,* Washington, D.C., 1995 (hereinafter "Joshi et. al."), Joshi, et. al. studied the lossy encoding of motion vectors using entropy-constrained vector quantization and have shown its advantage over the full-search method in terms of the rate-distortion performance. Though it has been shown that a significant bit rate reduction can be achieved at the cost of a relatively small drop in prediction error, the rapid degradation of performance at lower rates makes it undesirable for low bit rate applications. Another disadvantage is that the performance in different bit rate ranges varies with the block size. There is no single block size that works well for all rates.

One reason that the method in Joshi et al. doesn't work well is the due to the fixed block size for motion compensation. In our algorithm, multiple ECVQ quantizers are built for multiple block sizes, and a quadtree-based coder adaptively segments the frame into variable-size blocks. The motion vector of each block is found and encoded using the code book for that block size and the overall distortion and rate are minimized. The overall optimal quadtree structure is constructed using a Lagrange multiplier method.

This paper is organized as follows: Section 2 formulates the problem and introduces the background of ECVQ and quadtree. Section 3 describes the details of our adaptive algorithm. Simulation results are presented and discussed in Section 4. Section 5 gives the conclusions and future work.

Definition of Distortion and Rate

Let I1(x, y) and I2(x, y) denote the intensities of two consecutive video frames. If the block size for motion compensation is N×N, for a given block B in the current frame and a motion vector m=(mx, my), we define the distortion between the original block and the motion compensated block in the previous frame to be their mean-square-error (MSE):

$$D(m) = \frac{1}{N^2} \sum_{(x,y) \in B} (I2(x,y) - I1(x+mx, y+my))^2$$

In the full-search method, the candidate motion vectors are all the vectors with a search window W, i.e., $-W \leq mx$, $my \leq W$. Let M denote the set of all possible motion vectors, for each block B, motion compensation is basically the following minimization process:

$$\min_{m \in M} D(m)$$

We define the rate to code a motion vector to be the first order entropy, $$R = \frac{(-P_m \log P_m)}{N^2}$$

bits/pixel, where $P_m$ is the probability of using the motion vector m from the codebook.

ECVQ of Motion Vectors

An efficient motion compensation and coding scheme should minimize both the average rate to code all the motion vectors in a frame and the average distortion. But these are two contradicting requirements: the more precise and detailed the motion compensation is, the less the prediction error (or distortion), but the more bits that are needed to code the motion information; and vise versa. However, one can make a choice as to how much more distortion one would like to trade for smaller rate. One method that allows this is the ECVQ proposed by Chou, Lookabaugh and Gray in P. A. Chou, T. Lookabaugh, and R. M. Gray, "Entropy-constrained vector quantization," IEEE Trans. on Acoustics, Speech and Signal Processing, Vol 37, pp. 31–42, Jan. 1989 (hereinafter Chou et al.).

The vector quantization of a motion vector can be interpreted as the following: Suppose for a block B, the true motion vector for it is $m^0$ but we are only allowed to represent it with a motion vector from the codebook C, the distortion thus induced being $d(m^0, m) = D(m)$.

The bits to encode the codeword index i(m) is $l(i(m)) = -\log(P_m)$. The goal of ECVQ is to minimize the objective measure:

$$\rho(m^0, m) = d(m^0, m) + \lambda l(i(m))$$

where the $\lambda$ controls the rate. When $\lambda = 0$, all emphasis is given to minimize the true prediction error, which corresponds to the full-search motion compensation. As $\lambda$ increases, the rate decreases while the distortion increases. More details on ECVQ can be found in Chou et al.

Principle of Quadtrees

The quadtree is a hierarchical data structure for describing two-dimensional regions. It is a straightforward representation that allows for the adaptive segmentation and efficient description of possibly complex 2D shapes. When the quadtree is used for image coding, which has been employed by several authors, the image is first pre-divided into blocks of a fixed and relatively large size. See. e.g., G. J. Sullivan and R. L. Baker, "Efficient quadtree coding of images and video," *IEEE Tran. Image Processing,* Vol. 3, No. 3, pp. 327–331, May 1994 —hereinafter "Sullivan et al."; J. Vaisey and A. Gersho, "Variable block-size image coding," *Proc. ICASSP,* pp. 25.1.1–25.1.4, April 1994; J. Vaisey, "Image compression with variable block size segmentation," IEEE Trans. Image Processing, Vol. 40, No.8, pp. 2040–2060, August 1992; and P. Strobach, "Tree-structured scene adaptive coder," *IEEE Trans. Communications,* Vol. 38, No. 4, pp. 477–486, April 1990. Each block can be subdivided into four sub-blocks which is a quarter of the predecessor. The subdividing can be repeated recursively many times, until there is no further blocks to divide, or no further division is needed. The resulting data structure is a tree where each parent node has four children. Each node corresponds to a sub-block in the image that can be uniquely identified. This structure can be easily described by a variable length code.

Other than the subdividing method described above, (which is also called the top-down method), a quadtree can also be constructed in a bottom-up fashion by testing whether to merge four adjacent sub-blocks. The construction starts with the smallest block size allowed and can be repeated recursively till the largest block size allowed is reached. In our work, we used the bottom-up construction.

The binary test that one uses to decide whether to merge the four child nodes depends greatly on the application and the objective function one tries to minimize. In our work, since the objective function we would like to minimize is the combined rate and distortion, $\rho$, we use the algorithm that is similar to that described in Sullivan et al..

Suppose we want to find the optimal quadtree for block $X_{n+1}$ of size $2^{n+1} \times 2^{n+1}$ and assuming that we already know the optimal quadtree structure for its four $2^n \times 2^n$ sub-blocks, $X_{n,i}$, i=1, 2, 3, 4. Let $D_{n+1}, r_{n+1}$ denote the distortion and rate for representing the block as a single leaf with block size $2^{n+1} \times 2^{n+1}$, and let $D_{n,i}, R_{n,i}$; i=1, 2, 3, 4, denote distortion and rate of its four optimal subtrees. The four subtrees are merged into one leaf node if $\Delta D \leq \lambda \Delta R$, where $$\Delta D = D_{n+1} - \sum_{i=1}^{4} D_{n,i} \text{ and}$$

$$\Delta R = \sum_{i=1}^{4} R_{n,i} - R_{n+1}.$$

This process results in a quadtree which is always optimal with respect to the objective function $\rho$.

Quadtree-based Adaptive Motion Coding ECVQ Codebook Design

First, we need to build ECVQ codebooks for each block size. The algorithm resembles the one described in Chou et al., but because the data to be quantized is in the motion vector domain while the distortion is defined in the image intensity domain, special measures need to be taken in generating the training data and computing the centroid. Given $\lambda$, a block size N, and an initial codebook, the algorithm to generate the ECVQ codebook is as follows.

1. For all blocks in the training sequence, compute and store D(m) for all valid motion vectors. For example, for an integer precision motion and a search range from −8 to 8, there are 289 valid motion vectors in total. If there are K current blocks, this K×289 distortion array constitutes the training data set.

2. Optimize the encoder for the decoder. That is, for each block, choose the best motion vector that minimizes the modified distortion measure $\rho$. During this process, calculate the probability (relative frequency) of each codeword and update the overall modified distortion $E(\rho)$. If the overall distortion is smaller than a threshold, stop. Otherwise continue.

3. Optimize the decoder for the encoder. For each codeword index, search all valid motion vectors and find the one that minimizes the average distortion E(d) over all the blocks that are assigned to this index. (Note that we use the original distortion measure d in the step). This motion vector is the new codeword for this index. Based on the index probabilities found in Step 2, update the codeword lengths l(i). Go to Step 2.

Note also that the above training algorithm differs from the one used in Joshi, et. al.. In Joshi et al., the codewords are fixed. In our algorithm, the codewords are updated each time we compute the 'centroid' in Step 3.

Quadtree-based Motion Coding

The largest block size we use in the quadtree structure is 16×16. Though a larger size can be chosen, we use 16×16 mainly for the purpose of comparing its performance with existing video coding algorithms. The smallest block size we use is 4×4, so there are 3 possible levels in the quadtree. The reason we don't use 2×2 or even 1×1 blocks is to avoid the noise present in the motion field obtained by using motion compensation on very small block sizes.

For each 16×16 block, a quadtree is built using the bottom-up method described above. For each sub-block that is a leaf, the corresponding ECVQ codebook is searched and the motion vector that gives the minimal modified distortion is chosen. The indices, along with the tree-structure, constitute all the motion information that needs to be sent.

Simulation Results

In this section we give the simulation results. We give the rate-distortion curves for four 8-bit monochrome sequences with different motion contents. They are 1) the "football" sequence with generic motion; 2) the "table tennis" sequence, which contains camera zooming; 3) the "flower garden" sequence, which contains camera panning; and 4) a sequence with a note pad on the table while the camera is rotating along its optical axis. The first three sequences all have size 352×240 while the last one is 320×240. The codebooks for 16×16, 8×8, and 4×4 blocks were generated based on the training of 5 pairs of consecutive frames, each pair from a different sequence. None of the test frames are from the training set.

Looking at the PSNRs (Peak Signal-to-Noise Ratios) of the prediction error for a frame vs. the average rates to send the motion information (including the overhead rates to send the quadtree structure) for the four different test sequences (using four rate-distortion curves, corresponding to four methods, namely, fixed-block-size ECVQ for block sizes of 16×16, 8×8, and 4×4, and our quadtree-based adaptive coder. The search window is limited to −8 to 8 in all cases.) We have the following observations:

1. The proposed adaptive scheme provides a larger range of rates on which one can operate than the fixed 16×16 and 8×8 ECVQ.

2. In all cases, irrespective of what kind of motion is present, the proposed quadtree-based method performs better than the others over almost all rates. Its rate-distortion curve has a large segment where it is relatively flat, which means a huge reduction in rates can be achieved with very little increase in prediction error. And for the same rates, the proposed method has a 2–4 dB PSNR improvement for lower rates.

3. For lower rates, the quadtree-based method can always achieve better PSNR than fixed 16×16 or 8×8 ECVQ. At higher rates, its performance is close to that of a 4×4 ECVQ, but not worse.

4. For a sequence with camera zooming, the fixed-block-size ECVQ is not desirable because it has no flat region on the rate-distortion curve with either block size. On the other hand, the quadtree-based method has a relative segment from high to lower rates. The advantage of this is quite visible.

5. For a sequence with camera panning, the performance of ECVQ with block size of 4×4 is extremely poor—the PSNR started to degrade rapidly while the rate is still relatively high. So if the target rate is in this rate range, using the quadtree-based coder is extremely beneficial.

6. For a sequence with camera rotation, the performance of the proposed scheme is very close to fixed 4×4 ECVQ over high to mid rates. Its advantage is only visible over a small range of low rates.

Conclusions Regarding Motion Compensation Using Quadtrees

In this paper we have presented an adaptive motion encoding scheme based on the quadtree data structure with ECVQ. A quadtree is constructed from bottom-up to decide the block size that best adapts to the frame content. The motion vector for each block is found from an entropy-constrained codebook according to its block size instead of doing the traditional full-search in the whole search window. Our simulation results have shown that it not only provides a dynamic range over all rates, which the full-search method cannot do, but also has a significant quality gain in terms of PSNR over the fixed-block-size ECVQ, especially over lower bit rates. This makes it a very good candidate for encoding motion in low-bit-rate applications.

For future work, we are considering the possibility of combining the quadtree structure with other faster algorithms for motion compensation. We are also working on using differential coding of motion vectors in a quadtree framework. We are also considering to build a closed loop video coder which incorporates the proposed adaptive motion coder with an adaptive coder for the residual frames.

Combining Global Transformation Estimation with Quadtree ECVQ

As described above, quadtree representation of ECVQ motion compensated encoding reduces both distortion and rate of an encoded motion video signal by selecting different block sizes to represent different portions of a motion video frame. Such implicitly involves determining the lesser of increased rate due to representing larger motion errors from larger block sizes and increased rate due to additional over head in representing more motion vectors for smaller block sizes. Between successive frames in which a camera is zooming, thereby applying a global scaling transformation to the entirety of the frames, motion compensating encoder 110 is likely to use smaller block sizes since motion vectors consider only translation transformations and larger block sizes involve larger motion errors, i.e., larger differences between corresponding motion-displaced blocks of successive frames.

However, since transformation filter 106 (FIG. 1) compensates for estimated global transformations pertaining to camera pan and zoom to form transformed current frame 108, transformed current frame 108 corresponds to reconstructed previous frame 112 more closely. Accordingly, motion compensating encoder 110 can use larger block sizes without excessively large motion errors. Yet, by using smaller block sizes when frames differ due to motion of the subject matter of the motion video image between successive frames rather than camera zoom, pan, or rotation, motion compensating encoder 110 achieves the efficiencies of quadtree ECVQ described above. Thus, the combination of quadtree ECVQ with compensation for global transformations between frames, e.g., transformations resulting from camera pan, zoom, and rotation, achieves simultaneous reductions is distortion and rate of encoded motion video signals heretofore unrealized.

Determination of Corresponding Pixel Positions Between Frames

As described above with respect to equation (1), estimation of global transformation parameters requires determination of corresponding positions of a particular pixel in different frames. Generally, pixels of a frame include only horizontal and vertical position information within the frame and the substantive value of the pixel. The substantive value of the pixel is the particular color of the pixel represented in any of a number of standard formats, including without limitation RGB, YUV, HSI, and YMC. Such information does not include information which necessarily correlates one pixel with a particular frame with another pixel of another frame, i.e., which necessarily indicates that the two pixels represent the same piece of subject matter in the two frames. However, such correlation between pixels of different frames is required to estimate global transformation parameters in the manner described above.

To some degree, translation transformations are estimated routinely on a block-by-block basis in motion estimation. One such motion estimation is commonly referred to as "three-stage log search plus half-pixel." The result of such motion estimation for a particular block is a two-dimensional vector representing spatial displacement of the block in a previous frame. Thus, the motion vector is an estimation of local translation of the block between frames.

In one embodiment, such motion estimation is performed on 16-pixel by 16-pixel blocks of a frame to provide a number of independent translation estimations distributed throughout the frame. The pixel at the center of each such block provides a sample of $(x_n, y_n)$ in equation (1) above. The pixel in the previous frame to which the motion vector for the block points from the center pixel of the block in the current frame points provides a corresponding sample of $(x_{n-1}, y_{n-1})$ in equation (1) above. From these samples of $(x_n, y_n)$ values and $(x_{n-1}, y_{n-1})$ values, transformation filter 106 estimates global transformation parameters in the manner described above.

Delivery of the Motion Compensated Frame

Figure 2:
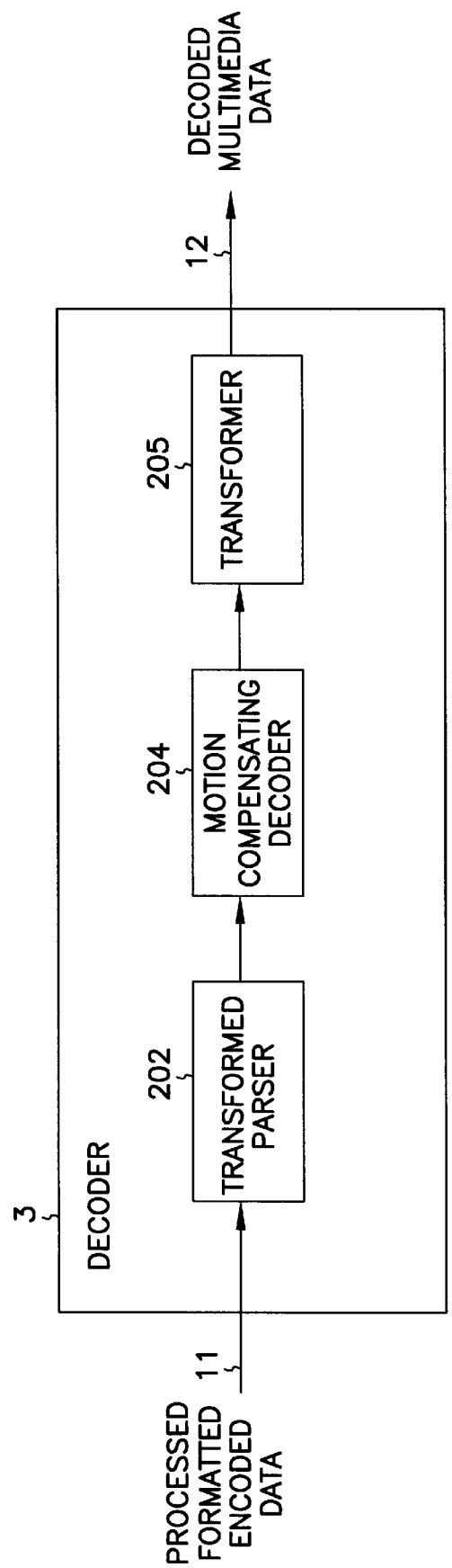
FIG. 2 is a block diagram of a video signal decoder according to the present invention.

Motion compensating encoder 110 encodes transformed current frame 108 using motion compensation between transformed current frame 108 and reconstructed frame 112. In addition, motion compensating encoder 110 includes global transformation parameters r, $z_x$, $z_y$, $t_x$, and $t_y$ in the encoding of the current frame. The encoded frame with global transformation parameters is stored in formatted encoded data 9 which is ultimately delivered to decoder 3 (FIG. 3) which is shown in greater detail in FIG. 2.

Decoder 3 includes a transformation parser 202, a motion compensating decoder 204, and a transformer 206. Transformation parser 202 receives an encoded frame from processed formatted encoded data 11 and parses global transformation parameters from the encoded frame. Motion compensating decoder 204 decodes a transformed frame from the encoded frame in a generally conventional manner. Transformer 206 receives the transformed frame and the global transformation parameters and performs a global transformation which is the inverse of the global transformation performed on the frame by motion compensating encoder 110 (FIG. 1) as described above. The result of such global transformation by transformer 206 (FIG. 2) is accurate reconstruction of the frame encoded by encoder 2 (FIG.

1) using global transformation to compensate for camera pan, zoom, and rotation.

System Overview

A compression system I (FIG. 3) includes encoder 2 and decoder 3. A network delivery system 4 includes a network delivery sender 5, a network 6, and a network delivery receiver 7.

Encoder 2 accepts as input original multimedia data 8 and generates as output formatted encoded data 9. Original multimedia data 8 can include multimedia data, including still image, video, or audio. Original multimedia data 8 is in a standard uncompressed digital format. With still image or video, for example, the data can be in the YUV 4:2:2 format. Original multimedia data 8 can exist in the form of a static file, or as a dynamic stream. Formatted encoded data 9 is a compressed representation of original multimedia data 8, and it is formatted for optimized delivery over heterogeneous networks.

Network delivery sender 5 accepts as input formatted encoded data 9, and generates as output streamed formatted encoded data 10. Network delivery sender 5 streams streamed formatted encoded data 10 over network 6. Network delivery sender 5 can stream this data for any purpose, including video-on-demand, multicast, and video-conferencing.

Network 6 transports streamed formatted encoded data 10 to network delivery receiver 7. Network delivery receiver 7 generates as output processed formatted encoded data 11. Processed formatted encoded data 11 includes either all of streamed formatted encoded data 10, or a subset of that data.

Decoder 3 accepts as input processed formatted encoded data 11 and generates as output decoded multimedia data 12. Decoded multimedia data 12 is a post-compression/decompression representation of original multimedia data 8. Decoded multimedia data 12 is delivered to playback device 13 which plays the decoded multimedia data 12. In the case of still image content, this would comprise displaying the image. In the case of audio content, this would comprise playing the audio content. In the case of video content, this would comprise playing the video content.

In general, the different components described above can be distributed across different hardware units.

Figure 3:
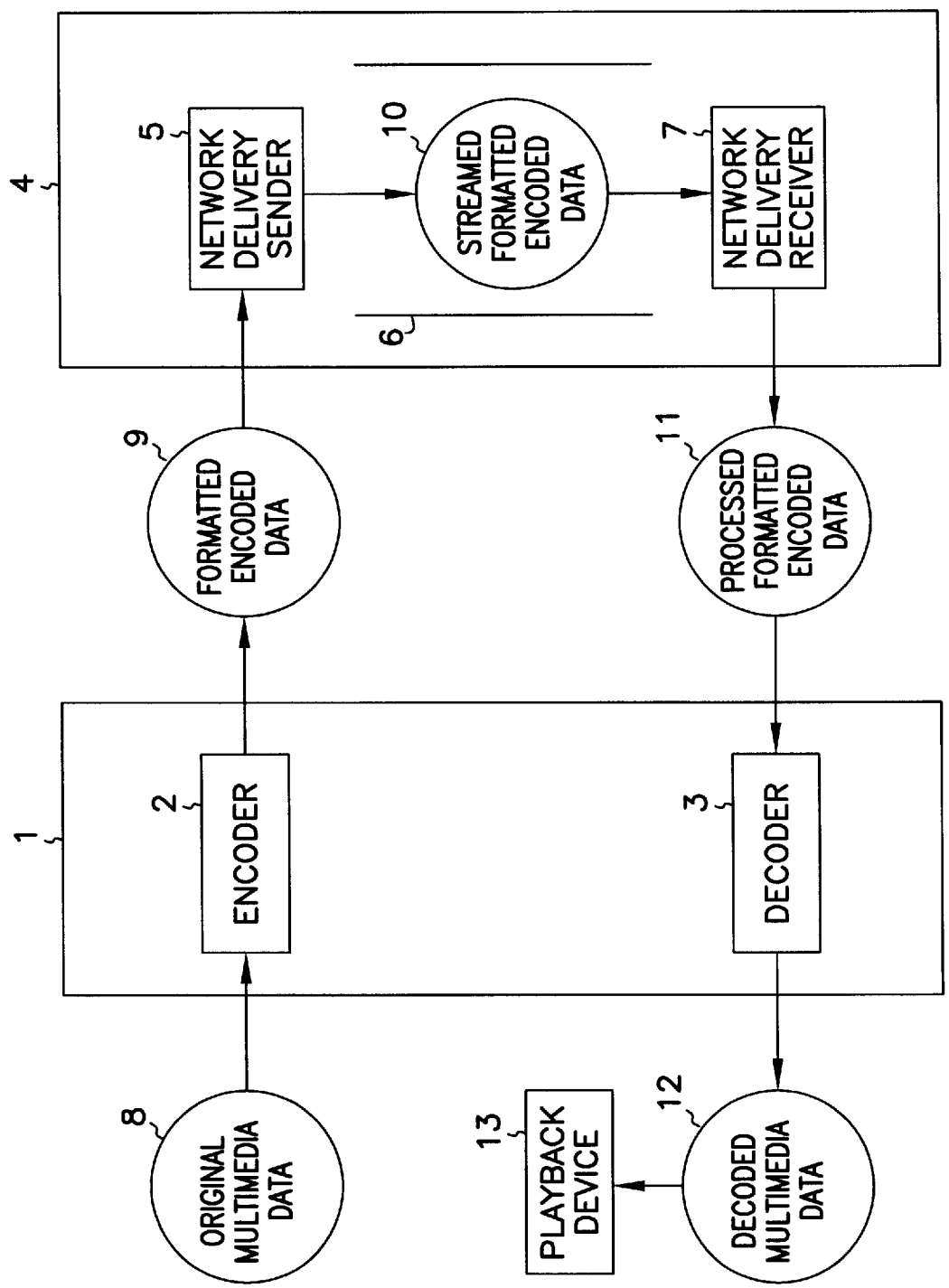
FIG. 3 is a block diagram of a compression system which includes the video signal encoder of FIG. 1 and the motion video signal decoder of FIG. 2.

The compression and network delivery system of FIG. 3 generates and processes universally scalable data, including frame rate scalable data. The data can be of any multimedia type, including still images, video, and audio. Universal scalability means that the multimedia data is scalable across all relevant characteristics of the data.

The above description is illustrative only and is not limiting. The present invention is limited only by the claims which follow.

What is claimed is:

1. A method for encoding a motion video image which includes two or more frames, the method comprising performing the following steps for each subject one of one or more of the frames to encode the subject frame to form an encoded frame:

(i) selecting a temporally displaced one of the frames other than the subject frame;

(ii) estimating a global transformation between the subject frame and the temporally displaced frame;

(iii) transforming the subject frame in accordance with the global transformation to form a transformed subject frame;

(iv) selecting one or more blocks of the transformed subject frame;

(v) for each of the blocks of the transformed subject frame, (a) forming a motion compensated block of the block with reference to a corresponding block of the temporally displaced frame;

(b) measuring a block distortion between the block and the motion compensated block;

(c) measuring a block rate of the motion compensated block in terms of an amount of data required to represent the motion compensated block;

(d) for each of two or more sub-blocks of the block, performing the following steps:

(1) forming a motion compensated sub-block with reference to a corresponding sub-block of the temporally displaced frame;

(2) measuring a sub-block distortion between the sub-block and the motion compensated sub-block; and (3) measuring a sub-block rate of the motion compensated sub-block in terms of an amount of data required to represent the motion compensated sub-block;

(e) constructing a composite sub-block distortion from the sub-block distortions;

(f) constructing a composite sub-block rate from the sub-block rates;

(g) measuring a relative distortion between the block distortion and the composite sub-block distortion;

(h) measuring a relative rate between the block rate and the composite sub-block rate;

(i) comparing the relative distortion to the relative weight according to a predetermined ratio of distortion and rate priorities to determine whether the motion compensated block or the motion compensated sub-blocks provide a better combination of distortion and rate;

(j) including the motion compensated block in the encoded frame if the motion compensated block provides a better combination of distortion and rate as determined in the step of comparing; and (k) including the motion compensated sub-blocks in the encoded frame if the motion compensated sub-blocks provide a better combination of distortion and rate as determined in the step of comparing.

2. The method of claim 1 further comprising performing the following steps for each subject one of the sub-blocks:

(l) for each of two or more sub-sub-blocks of the sub-block, performing the following steps:

(1) forming a motion compensated sub-sub-block with reference to a corresponding sub-sub-block of the temporally displaced frame;

(2) measuring a sub-sub-block distortion between the sub-sub-block and the motion compensated sub-sub-block; and (3) measuring a sub-sub-block rate of the motion compensated sub-sub-block in terms of an amount of data required to represent the motion compensated sub-sub-block;

(m) constructing a composite sub-sub-block distortion from the sub-sub-block distortions;

(n) constructing a composite sub-sub-block rate from the sub-sub-block rates;

(o) measuring a sub-block relative distortion between the sub-block distortion of the subject sub-block and the composite sub-sub-block distortion;

(p) measuring a sub-block relative rate between the sub-block rate of the subject sub-block and the composite sub-sub-block rate;

(q) comparing the sub-block relative distortion to the sub-block relative weight according to the predetermined ratio of distortion and rate priorities to determine whether the motion compensated sub-block or the motion compensated sub-sub-blocks provide a better combination of distortion and rate;

(s) including the motion compensated sub-block in the encoded frame if the motion compensated sub-block provides a better combination of distortion and rate as determined in step (q); and (t) including the motion compensated sub-sub-blocks in the encoded frame if the motion compensated sub-sub-blocks provide a better combination of distortion and rate as determined in step (q).

3. A computer readable medium useful in association with a computer which includes a processor and a memory, the computer readable medium including computer instructions which are configured to cause the computer to encode a motion video image which includes two or more frames by performing the following steps for each subject one of one or more of the frames to encode the subject frame to form an encoded frame:

(i) selecting a temporally displaced one of the frames other than the subject frame;

(ii) selecting one or more blocks of the subject frame;

(ii) for each of the blocks of the subject frame, (a) forming a motion compensated block of the block with reference to a corresponding block of the temporally displaced frame;

(b) measuring a block distortion between the block and the motion compensated block;

(c) measuring a block rate of the motion compensated block in terms of an amount of data required to represent the motion compensated block;

(d) for each of two or more sub-blocks of the block, performing the following steps:

(1) forming a motion compensated sub-block with reference to a corresponding sub-block of the temporally displaced frame;

(2) measuring a sub-block distortion between the sub-block and the motion compensated sub-block; and (3) measuring a sub-block rate of the motion compensated sub-block in terms of an amount of data required to represent the motion compensated sub-block;

(e) constructing a composite sub-block distortion from the sub-block distortions;

(f) constructing a composite sub-block rate from the sub-block rates;

(g) measuring a relative distortion between the block distortion and the composite sub-block distortion;

(h) measuring a relative rate between the block rate and the composite sub-block rate;

(i) comparing the relative distortion to the relative weight according to a predetermined ratio of distortion and rate priorities to determine whether the motion compensated block or the motion compensated sub-blocks provide a better combination of distortion and rate;

(j) including the motion compensated block in the encoded frame if the motion compensated block provides a better combination of distortion and rate as determined in the step of comparing; and (k) including the motion compensated sub-blocks in the encoded frame if the motion compensated sub-blocks provide a better combination of distortion and rate as determined in the step of comparing.

4. The computer readable medium of claim 3 wherein the computer instructions are further configured to cause the computer to cause the computer to perform the following steps for each subject one of the sub-blocks:

(l) for each of two or more sub-sub-blocks of the sub-block, performing the following steps:

(1) forming a motion compensated sub-sub-block with reference to a corresponding sub-sub-block of the temporally displaced frame;

(2) measuring a sub-sub-block distortion between the sub-sub-block and the motion compensated sub-sub-block; and (3) measuring a sub-sub-block rate of the motion compensated sub-sub-block in terms of an amount of data required to represent the motion compensated sub-sub-block;

(m) constructing a composite sub-sub-block distortion from the sub-sub-block distortions;

(n) constructing a composite sub-sub-block rate from the sub-sub-block rates;

(o) measuring a sub-block relative distortion between the sub-block distortion of the subject sub-block and the composite sub-sub-block distortion;

(p) measuring a sub-block relative rate between the sub-block rate of the subject sub-block and the composite sub-sub-block rate;

(q) comparing the sub-block relative distortion to the sub-block relative weight according to the predetermined ratio of distortion and rate priorities to determine whether the motion compensated sub-block or the motion compensated sub-sub-blocks provide a better combination of distortion and rate;

(s) including the motion compensated sub-block in the encoded frame if the motion compensated sub-block provides a better combination of distortion and rate as determined in step (q); and (t) including the motion compensated sub-sub-blocks in the encoded frame if the motion compensated sub-sub-blocks provide a better combination of distortion and rate as determined in step (q).

5. A computer system comprising:

a processor, a memory operatively coupled to the processor; and a motion video signal encoder which executes in the processor from the memory and which, when executed by the processor, encodes a motion video image which includes two or more frames by performing the following steps for each subject one of one or more of the frames to encode the subject frame to form an encoded frame:

(i) selecting a temporally displaced one of the frames other than the subject frame;

(ii) selecting one or more blocks of the subject frame;

(iii) for each of the blocks of the subject frame, (a) forming a motion compensated block of the block with reference to a corresponding block of the temporally displaced frame;

(b) measuring a block distortion between the block and the motion compensated block;

(c) measuring a block rate of the motion compensated block in terms of an amount of data required to represent the motion compensated block;

(d) for each of two or more sub-blocks of the block, performing the following steps:

(1) forming a motion compensated sub-block with reference to a corresponding sub-block of the temporally displaced frame;

(2) measuring a sub-block distortion between the sub-block and the motion compensated sub-block; and (3) measuring a sub-block rate of the motion compensated sub-block in terms of an amount of data required to represent the motion compensated sub-block;

(e) constructing a composite sub-block distortion from the sub-block distortions;

(f) constructing a composite sub-block rate from the sub-block rates;

(g) measuring a relative distortion between the block distortion and the composite sub-block distortion;

(h) measuring a relative rate between the block rate and the composite sub-block rate;

(i) comparing the relative distortion to the relative weight according to a predetermined ratio of distortion and rate priorities to determine whether the motion compensated block or the motion compensated sub-blocks provide a better combination of distortion and rate;

(j) including the motion compensated block in the encoded frame if the motion compensated block provides a better combination of distortion and rate as determined in the step of comparing; and (k) including the motion compensated sub-blocks in the encoded frame if the motion compensated sub-blocks provide a better combination of distortion and rate as determined in the step of comparing.

6. The computer system of claim 5 wherein the motion video signal encoder, when executed by the processor, further performs the following steps for each subject one of the sub-blocks:

(l) for each of two or more sub-sub-blocks of the sub-block, performing the following steps:

(1) forming a motion compensated sub-sub-block with reference to a corresponding sub-sub-block of the temporally displaced frame;

(2) measuring a sub-sub-block distortion between the sub-sub-block and the motion compensated sub-sub-block; and (3) measuring a sub-sub-block rate of the motion compensated sub-sub-block in terms of an amount of data required to represent the motion compensated sub-sub-block, (m) constructing a composite sub-sub-block distortion from the sub-sub-block distortions;

(n) constructing a composite sub-sub-block rate from the sub-sub-block rates;

(o) measuring a sub-block relative distortion between the sub-block distortion of the subject sub-block and the composite sub-sub-block distortion;

(p) measuring a sub-block relative rate between the sub-block rate of the subject sub-block and the composite sub-sub-block rate;

(q) comparing the sub-block relative distortion to the sub-block relative weight according to the predetermined ratio of distortion and rate priorities to determine whether the motion compensated sub-block or the motion compensated sub-sub-blocks provide a better combination of distortion and rate;

(s) including the motion compensated sub-block in the encoded frame if the motion compensated sub-block provides a better combination of distortion and rate as determined in step (q); and (t) including the motion compensated sub-sub-blocks in the encoded frame if the motion compensated sub-sub-blocks provide a better combination of distortion and rate as determined in step (q).

* * * * *